July 26, 1938.  I. J. WASLEY  2,125,139
SAFE
Filed Sept. 14, 1936  2 Sheets-Sheet 1
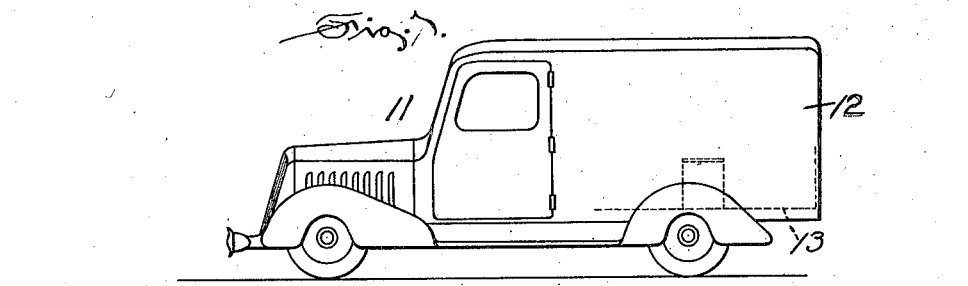
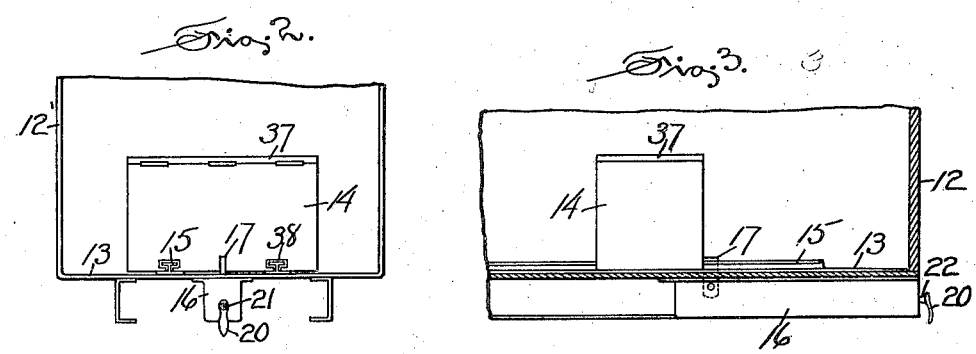
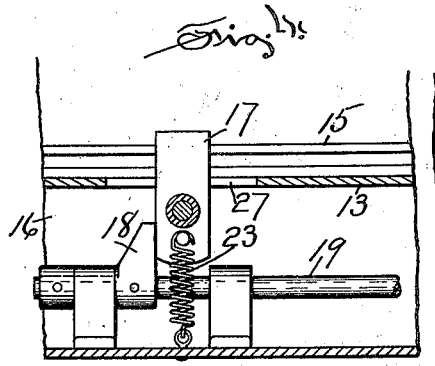
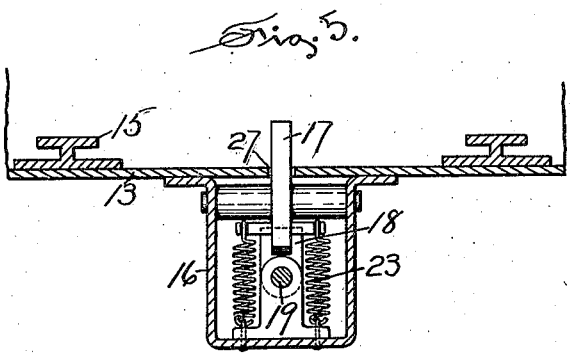

July 26, 1938. I. J. WASLEY 2,125,139
SAFE
Filed Sept. 14, 1936 2 Sheets-Sheet 2
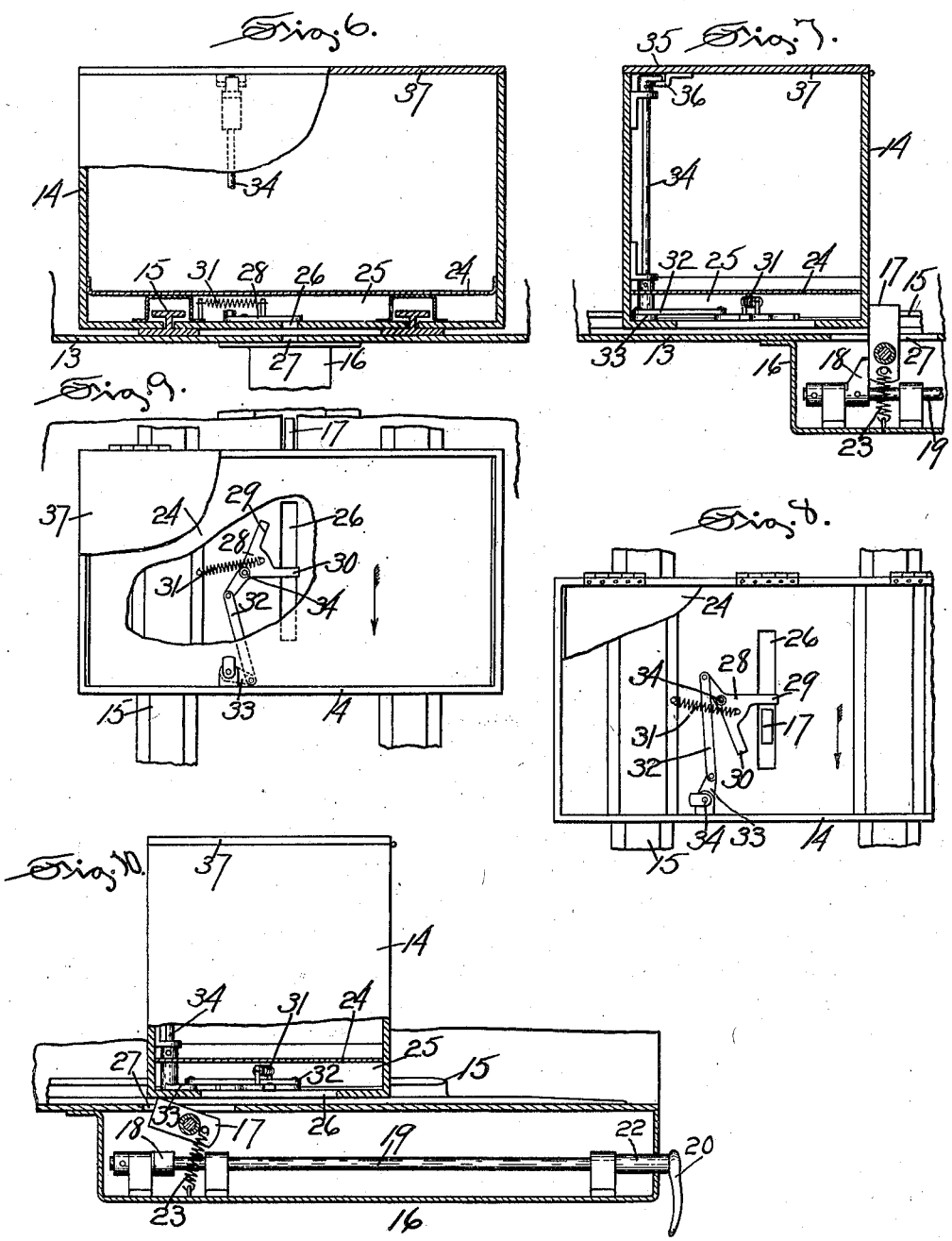

Patented July 26, 1938

2,125,139

UNITED STATES PATENT OFFICE 2,125,139

SAFE

Irving J. Wasley, Bristol, Conn.

Application September 14, 1936, Serial No. 100,586

13 Claims. (Cl. 109—1)

My invention relates to the class of receptacles that are employed for the safe keeping of property of valuable sorts, and an object of my invention, among others, is to provide means whereby such property may be made secure against theft and particularly where it is to be transported.

One form of a receptacle embodying my invention and in the construction and use of which the objects herein set out, as well as others, may be attained is illustrated in the accompanying drawings in which Figure 1 is a side view of an automobile equipped with my improved receptacle or safe.

Figure 2 is a view on enlarged scale looking from the rear into the body of an automobile, the running gear being omitted and my improved safe being shown in position.

Figure 3 is a view in lengthwise section through a portion of the body of an automobile showing my improved safe in place.

Figure 4 is a detail sectional view on scale further enlarged illustrating in side view a portion of the locking mechanism that secures the safe in place.

Figure 5 is a view in cross section illustrating said locking mechanism.

Figure 6 is a view in lengthwise section through the safe or box and the floor upon which it rests.

Figure 7 is a view in vertical cross section through the box or safe showing it locked in place.

Figure 8 is a top view of the box with the cover broken away and also the inner bottom being partially broken away to illustrate the mechanism for locking the cover in the box.

Figure 9 is a similar view illustrating said locking mechanism in position with the cover locked.

Figure 10 is a view partially in vertical section showing the position of the parts of the locking mechanism as the box is being slid into place on its support.

My invention contemplates a receptacle in the form of a box or safe together with a support, as the floor of an automobile or other device, equipped with means to receive the box or safe and with means for locking it in place so that it cannot be unlawfully removed, and while I have illustrated my invention as embodied in a structure as above described, yet, I contemplate that the floor or support upon which the box may be fastened may be other than the floor of an automobile body.

In the accompanying drawings the numeral 11 denotes in general an automobile comprising the hood, wheels, mudguard, running board, etc. and including a body 12 with its floor 13. This floor affords a support for a box or receptacle 14 and means are provided for locking the box in place. Various means may be employed, that herein shown comprising rails 15 of T-shape in cross section extending lengthwise of the vehicle body. A housing 16 is located underneath the floor or support 13 as shown in Figs. 2, 3 and 7 of the drawings. This housing contains a locking bolt 17 pivotally mounted and extending through the floor or support 13 into the path of movement of the box 14 as it is slid into place on the floor or support. A locking dog 18 is secured to a shaft 19 rotatably mounted in the housing and as shown in Figs. 4 and 7 of the drawings, said shaft extending out at the rear end of the housing, the outer end of the shaft being provided with a handle 20 which contains a lock 21 which may be of the pin tumbler or any other suitable construction to receive a key to release the shaft so that it may be turned to remove the dog 18 from the path of the locking bolt 17, thereby allowing the latter to function. The lock 21 includes a lock case 22, which parts may be arranged in any suitable manner and as will be readily understood by those skilled in the art and therefore further and detailed description is omitted herein. The bolt 17 is urged into its locking position as by means of springs 23.

The box or receptacle 14 has an inner bottom 24 as shown in Figs. 6 to 10. This bottom creates a chamber 25 with a slot 26 opening from said chamber through the bottom of the box, it being here remarked that the locking bolt 17 operates through a slot 27 in the support or floor 13 as well as through the slot 26 in a manner to be shortly described An actuator 28 is pivotally mounted within the chamber 25 preferably on the bottom of said chamber, this actuator having two fingers 29—30 as shown in Figs. 8 and 9 of the drawings, these fingers being adapted to lie across the slot 26. This actuator is spring urged in opposite directions as by a spring 31 which is so arranged that it will pass to opposite sides of the pivot of the actuator so that, as shown in Fig. 8, the spring urges the actuator in one direction and, as shown in Fig. 9, it urges said actuator in the opposite direction. A link 32 pivotally connects the actuator with an arm 33 secured to the lower end of a locking shaft 34 pivotally mounted within the box or receptacle and extending vertically therein along the front wall. The shaft has a locking bolt 35 secured to its upper end that is adapted to engage a keeper 36 secured to the under side of the cover 37 of the box or receptacle, and as shown in Fig. 7 of the drawings.

In the operation of the device the lock 21 being unlocked and the shaft 19 being rotated to remove the dog 18 from the path of movement of the locking bolt 17, the latter is free to swing. The box or receptacle 14 being now engaged with the rails 15 at the open end of said chamber which rails pass through T-shaped openings 38 at the back and front of the box, the latter is slid into the chamber in the vehicle body from the open end toward the opposite end thereof. In this sliding movement the front of the box first strikes the locking bolt 17 and presses the latter downwardly into the position shown in Fig. 10. As soon as the slot 26 uncovers said bolt the latter rises into and through the slot under the influence of its spring 23 and into the position shown in Fig. 8 of the drawings. Movement of the box or receptacle being continued in the direction of the arrows shown in Figs. 8 and 9 the finger 29 on the actuator 28 encounters the bolt 17, and the spring 31 being weaker than the springs 23, the actuator is swung on its pivot into the position shown in Fig. 9. This movement of the actuator through the link 32 and arm 33 imparts rotation to the shaft 34, thereby swinging the locking bolt 35 into engagement with the keeper 36. The cover 37 of the box is thereby securely locked and as movement of the box or receptacle continues the bolt 17 snaps upwardly into the path of the box. The handle 20 being now manipulated to rotate the shaft 19, the dog 18 is placed in the path of swinging movement of the locking bolt 17 and the box is therefore securely locked so that is cannot be slid backwardly along the rails and removed from the open end of said chamber in the vehicle body, and a key will be required to release the lock 21 to permit rotation of the shaft 19 to free the bolt 17. This being done the box or receptacle may now be slid backwardly within and toward the open end of the chamber in the vehicle body, in this movement the bolt 17 being depressed until the slot 26 uncovers it whereupon it will rise into and through said slot in the path of movement of the finger 30, thereby moving said finger and operating the shaft 24 to disengage the locking bolt 35 from its keeper 36, thereby releasing the cover.

As hereinbefore explained the spring 31 holds the actuator 28 in both its locking and unlocking positions, and the box or receptacle having been placed in position in the vehicle body, it is locked therein and its cover is also locked and a single key will be required to release the box and at the same time unlock the cover.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A safety deposit receptacle including a support, a locking member on said support, a box movably engageable with said locking member, means for automatically engaging said locking member with said box, a device for preventing disengagement of said box from said locking member, and means for locking said device to prevent its disengagement from said locking member.

2. A safety deposit receptacle including a support, a locking member on said support, a box slidable forwardly on said support to engage said locking member, means for automatically engaging said locking member with said box, a device to hold said locking member and thereby prevent backward sliding movement of said box on said support, a rotatably mounted shaft operatively engaged with said device, and means for locking said shaft against rotation to retain said device in the path of movement of said box.

3. A safety deposit receptacle including a support, a locking member pivotally attached to said support, a box slidable on said support to engage said locking member, a device movable into the path of movement of said locking member, means engageable with said device to effect its movement, and means for locking said operatively engaged means to hold said locking member and thereby prevent movement of said locking member from the path of said box.

4. A safety deposit receptacle including a support, a pair of T-shaped rails secured to said support, a box having means to slidably engage said rails and to prevent lateral disengagement therefrom, a member movable into the path of movement of said box, means engageable with said member to prevent its movement, and means for locking said engageable means to prevent movement of said member from the path of said box.

5. A safety deposit receptacle including a support, retaining means on said support, a box movably engageable with said retaining means, a locking bolt movable into the path of said box, a dog to prevent movement of said locking bolt, means for operating said dog, and means for locking said operating means to prevent movement of said dog from engagement with said bolt.

6. A safety deposit receptacle including a support, retaining means on said support, a box movably engageable with said retaining means, a bolt movable into the path of said box to prevent it from sliding on said retaining means, a dog movable into the path of movement of said bolt, a rotatably mounted shaft to which said dog is secured, and means for locking said shaft against rotation.

7. A safety deposit receptacle including a support, retaining means on said support, a box slidably engageable with said retaining means, a cover for said box, a lock for said cover, an actuator within the box operatively connected with said lock, a locking bolt mounted to operatively engage said actuator, said bolt being movable into the path of said box to prevent its movement, and means for locking said bolt.

8. A safety deposit receptacle including a support, retaining means on said support, a box movably engageable with said retaining means, a cover for said box, a lock for said cover, an actuator within the box operatively connected with said lock, a locking bolt mounted for movement into the path of said box and also through a slot in the bottom of said box to operatively engage said actuator, and means for locking said bolt against movement.

9. A safety deposit receptacle including a support, retaining means on said support, a box movably engageable with said retaining means, a cover for said box, a lock for said cover, an actuator within the box operatively connected with said lock, said actuator including locking and unlocking fingers, a locking bolt mounted for movement into the path of said box and also through a slot in the bottom thereof to operatively engage said fingers, and means for locking said bolt against movement.

10. A safety deposit receptacle including a support, retaining means on said support, a box movably engageable with said retaining means, said box having a slot through the bottom thereof, a cover for said box, a lock for said cover, an actuator within the box operatively connected with said lock said actuator comprising locking and unlocking fingers extending from the end thereof across said slot, a locking bolt mounted for movement into the path of said box and also through said slot to engage said locking fingers, and means for locking said bolt against movement.

11. A safety deposit receptacle including a support, retaining means on said support, a box movably engageable with said retaining means, a cover for said box, a lock for said cover, an actuator within the box operatively connected with said lock, a locking bolt mounted for movement into the path of said box and also through a slot in the bottom thereof to engage said actuator, a housing on the under side of said support, a shaft rotatably mounted in said housing, a dog on said shaft to be projected into the path of movement of said locking bolt, and means for locking said shaft against rotation.

12. A safety deposit receptable including a support, retaining means on said support, a box slidably engageable with said retaining means, a cover for said box, a lock for said cover, an actuator for said lock, and means operable by reason of movement of the box to operate said lock.

13. A safety deposit receptacle including a support, a box slidably mounted on said support, a locking member pivotally mounted in the path of movement of said box to permit free forward sliding movement thereof on said support, means for securing said locking member to prevent backward sliding movement of said box, and means for locking said securing means to prevent its operation.

IRVING J. WASLEY.